No. 700,910. Patented May 27, 1902.
J. GLENN.
PITMAN CONNECTION.
(Application filed Dec. 23, 1901.)
(No Model.)

Witnesses
Inventor
John Glenn
By
Attorneys

UNITED STATES PATENT OFFICE.

JOHN GLENN, OF KENTON, OHIO.

PITMAN CONNECTION.

SPECIFICATION forming part of Letters Patent No. 700,910, dated May 27, 1902.

Application filed December 23, 1901. Serial No. 86,968. (No model.)

*To all whom it may concern:*

Be it known that I, JOHN GLENN, a citizen of the United States, residing at Kenton, in the county of Hardin and State of Ohio, have invented certain new and useful Improvements in Pitman Connections; and I do declare the following to be a full, clear, and exact description of the invention, such as will enable others skilled in the art to which it appertains to make and use the same.

The invention relates to pitman-rod couplings or connections for movably or articularly connecting the power-receiving end of a pitman-rod to a coöperating part, such as to the crank or actuating member of a mowing-machine.

The object of the invention is to provide a pitman with a connection which shall be simple of construction, comparatively inexpensive of production, efficient in operation, and adapted to be readily and conveniently applied and removed to secure the free articulation of the parts and to form couplings which are not liable to casual separation.

With these and other objects in view the invention consists of certain novel features of construction, combination, and arrangements of parts, which will be hereinafter more fully described, and particularly pointed out in the appended claims.

Figure 1:
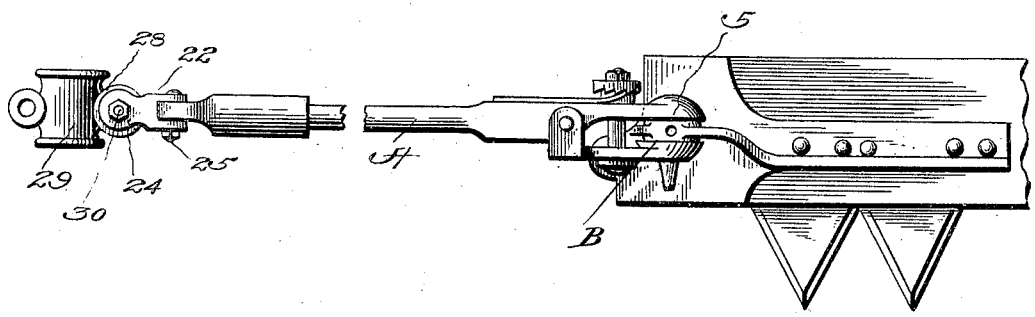
Figure 2:
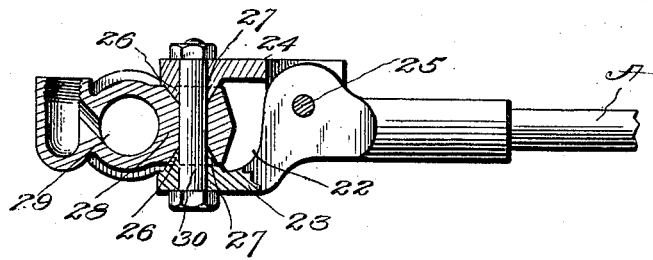

In the accompanying drawings, Figure 1 is a top plan view of a pitman-rod embodying my invention, and Fig. 2 is a detail sectional view of the coupling member which connects the rod to the actuating member on the machine.

In the drawings, A denotes the pitman-rod, one end of which is connected to the cutter-bar by any well-known or approved form of coupling, (designated by the numeral B.)

The coupling at the opposite end of the rod from the socket 5 and which connects said rod with the crank or drive element on the machine comprises a yoke 22, having a fixed arm 23, formed integrally with the rod, and a movable arm 24, pivoted to said rod by a pin or bolt 25, so as to be adjusted toward and from said fixed arm, said pin or bolt being adapted to hold the arm 24 fixed in adjusted position. If desired, however, a rivet may be employed instead of the pin or bolt, so that after the arm has been adjusted said arm may be held fixed by heading the rivet. In fact, any preferred and suitable construction of fastening may be employed. The arms 23 and 24 are formed with hollow conical bearing-bosses 26, which are journaled in the conical seats 27 of a socket 28, formed upon a coupling 29, which is adapted to be connected to the crank-arm or power-transmitting device of the drive mechanism of a mower or other machine. These parts are held connected by a bolt 30, passed through said bosses. The mode of applying and removing this connection will be apparent, and it will be seen that the conical formation of the bosses adapts them to be conveniently and accurately adjusted to compensate for wear.

From the foregoing description, taken in connection with the accompanying drawings, the construction, mode of operation, and advantages of the invention will be readily understood without a further extended description, and it will be seen that coupling connections are provided which are simple of construction, comparatively inexpensive of production, reliable in action, and adapted to permit of free articulation of the movable parts.

Various changes in the form, proportion, and details of construction may be made within the scope of the invention without departing from the spirit or sacrificing any of the advantages thereof.

Having thus described my invention, what I claim, and desire to secure by Letters Patent, is—

A pitman-rod having an articulate coupling comprising a coupling member having a socket formed with seats, a yoke whose jaws are provided with bosses to engage said seats, one of said jaws being fixed and the other pivoted, and a bolt passing through the bosses and seats, substantially as described.

In testimony whereof I have hereunto set my hand in presence of two subscribing witnesses.

JOHN GLENN.

Witnesses:
W. J. GLENN,
L. G. MILLER.